US007233972B2

(12) United States Patent
Minow

(10) Patent No.: US 7,233,972 B2
(45) Date of Patent: *Jun. 19, 2007

(54) METHOD AND APPARATUS FOR COORDINATION OF CLIENT/SERVER PROCESSES

(75) Inventor: Martin A. Minow, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/157,764

(22) Filed: May 28, 2002

(65) Prior Publication Data

US 2003/0074483 A1 Apr. 17, 2003

Related U.S. Application Data

(63) Continuation of application No. 09/161,112, filed on Sep. 25, 1998, now Pat. No. 6,418,464.

(51) Int. Cl.
*G06F 9/44* (2006.01)
*G06F 15/16* (2006.01)

(52) U.S. Cl. .................. 709/203; 709/237; 719/318

(58) Field of Classification Search ............. 709/203, 709/227, 224; 719/315, 318
See application file for complete search history.

(56) References Cited

U.S. PATENT DOCUMENTS 5,109,486 A  4/1992 Seymour ................ 709/224

(Continued)

FOREIGN PATENT DOCUMENTS

EP       274339 A   *  7/1988

OTHER PUBLICATIONS

Saehwa Kim et al., "Scenario-based implementation architecture for real-time object-oriented models", IEEE International Workshop on Object-Oriented Real-Time Dependable Systems, p. 147-152, Jan. 2002.*

(Continued)

*Primary Examiner*—Patrice Winder
(74) *Attorney, Agent, or Firm*—Hickman Palermo Truong & Becker LLP

(57) ABSTRACT

The invention provides for the coordination of client/server processes. One or more embodiments provide a completion object comprised of various states of completion of a client request. The completion object may be manipulated to transition from one state to another by both the client and server. The following states of completion may be provided: idle, ready, active, completing, completed, and acknowledged. In the idle state, the completion object is obtained by the client (by constructing a new object or retrieving an existing object that has been recycled). In the ready state, the request has been initialized but not yet issued to the server or I/O device. In the active state, the server processes the I/O request. In the completing state, the server has completed the I/O operations requested but has not yet stored the results. In the completed state, the server stores the results to be returned to the client and notifies the client. At the acknowledged state, the client examines the results, performs additional operations and frees up the completion object for use by another client request. Depending on the state of the completion object, a request to cancel the I/O operations may require varying actions. The completion object provides the ability to easily and quickly determine where in the completion process an I/O request is. Further, when a client request is canceled, the completion object provides the ability to easily identify the actions necessary to properly cancel the request.

39 Claims, 3 Drawing Sheets

U.S. PATENT DOCUMENTS

| | | | | |
|---|---|---|---|---|
| 5,519,863 | A | * | 5/1996 | Allen et al. .................. 719/318 |
| 5,596,710 | A | * | 1/1997 | Voigt ............................ 714/19 |
| 5,655,081 | A | * | 8/1997 | Bonnell et al. ............. 709/202 |
| 5,696,910 | A | * | 12/1997 | Pawlowski .................. 710/100 |
| 5,768,510 | A | * | 6/1998 | Gish ............................ 709/203 |
| 5,781,737 | A | | 7/1998 | Schmidt ..................... 709/224 |
| 5,889,944 | A | | 3/1999 | Butt et al. ................... 709/203 |
| 5,907,675 | A | * | 5/1999 | Aahlad ........................ 709/203 |
| 5,917,730 | A | * | 6/1999 | Rittie et al. ..................... 703/6 |
| 5,931,919 | A | | 8/1999 | Thomas et al. ............. 709/315 |
| 5,956,509 | A | | 9/1999 | Kevner ........................ 395/684 |
| 5,978,846 | A | | 11/1999 | Kimishima .................. 709/227 |
| 6,052,722 | A | * | 4/2000 | Taghadoss ................... 709/223 |
| 6,076,108 | A | | 6/2000 | Courts et al. ................ 709/227 |
| 6,112,015 | A | | 8/2000 | Planas et al. ................ 709/223 |
| 6,128,657 | A | | 10/2000 | Okanoya et al. ............. 709/224 |
| 6,266,703 | B1 | * | 7/2001 | Clark et al. .................. 709/237 |
| 6,292,803 | B1 | * | 9/2001 | Richardson et al. ......... 707/102 |
| 6,418,464 | B1 | * | 7/2002 | Minow ........................ 709/203 |
| 6,430,607 | B1 | * | 8/2002 | Kavner ........................ 709/217 |
| 6,480,955 | B1 | * | 11/2002 | DeKoning et al. ........... 713/100 |
| 6,788,315 | B1 | * | 9/2004 | Kekic et al. ................. 709/203 |

OTHER PUBLICATIONS

Agha, G., "Concurrent Object-Oriented Programming" *Comm. of the ACM*, vol. 33, No. 9 (1990) pp. 125-141.

Lieberman, H., "Using the prototypical objects to implement shared behavior in object-oriented systems", *OOPSLA '86 proceedings* (1986) pp. 214-223.

Manione et al., "Simulation of object-oriented distribution systems via compilation to concurrent process level", *Simulation Symposium* (1995) pp. 240-249.

Sydir, J. et al., "Providing end-to-end QoS assurances in COBRA-based system", *ISORC '98 proceedings* (1998) pp. 53-61.

Thompson, T. et al., "Adding Apple Events to Your Mac Application: Part 1", *Byte Magazine* (1995) pp. 1-4.

* cited by examiner

METHOD AND APPARATUS FOR COORDINATION OF CLIENT/SERVER PROCESSES

CROSS-REFERENCES TO RELATED APPLICATIONS

This is a continuation of U.S. patent application Ser. No. 09/161,112, filed Sep. 25, 1998, now issued as U.S. Pat. No. 6,418,464.

BACKGROUND OF THE INVENTION

1. Field of the Invention

This invention relates to the field of computer software, and, more specifically, to completing input/output transactions.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Apple, Macintosh, AppleTalk, AppleScript, and all Apple-based trademarks and logos are trademarks or registered trademarks of Apple Computer, Inc. in the United States and other countries.

2. Background Art

A computer interacts with and communicates with various peripheral devices (also referred to as input-output (I/O) devices) such as printers, scanners, video displays, keyboards, disk drives, modems, CD drives, etc. I/O devices convert information from one physical representation to another for processing and storage within a computer. Thus, I/O devices are the means by which a computer communicates with the outside world. The processing and storing of I/O device information occurs within the main memory or central processing unit (CPU) of a computer.

In modern computer operating systems, functions, operations and processes may be carried out through asynchronous interaction between client and server processes. For example, a client may be a high-level device driver (a software component that contains the computer code needed to use an attached device) and a server may be the software component that directly manages the physical device. Through a client process, the client requests a specific function, action, or resource of the server.

One aspect of such computer operating systems is to ensure that each client request completes and is only acted on exactly once (i.e., no request may be lost and none may be processed twice). For example, a request may complete normally or it may complete abnormally due to user action, a hardware failure, or a time-out (i.e., the specified time limit for the server to respond to the client request expired). The underlying operating system must also permit clients to terminate requests after they have been issued without regard to the precise state of the request (e.g., the request may not have been forwarded to the server, or may already have been completed when the client's request to terminate the request was received). Furthermore, in a multi-processing system, there may be multiple clients and servers executing on independent hardware processors (so called "symmetric multiprocessing") that can initiate, process, abort, or complete a request, and the operating system must ensure that exactly one of these competing processes actually operates on the request even if it had been initiated, processed, or aborted on a different processor.

One prior art method to ensure process completion and single execution consists of the client setting a flag to indicate whether the server process should continue or be terminated. In such a method, the server must periodically examine the status of the flag.

Prior art methods do not precisely track client I/O requests resulting in two process paths of completion, one path from the client, and one path for the server. Further, the notification to clients (regarding completion of a request) and notification to the server (of a standard request or a request to terminate a standard request) is dependent on the type of request, and the procedure that implements and completes the request. Thus, when a request is initiated by a client, the client waits for the completion of the request and is not informed and cannot obtain the status of the request. For example, some implementations of the UNIX operating system has a client start and wait or sleep approach. In such an approach, a client request is initiated and then waits for the server to complete the request. The client enters a "sleep" mode until the request is completed. Alternatively, the Macintosh environment, when a client request is started, the client specifies the address of a subroutine to be called when the request is completed by the server. If no address is provided, the client process waits for completion of the process and performs no other functions.

In the prior art, the client is unable to pick and choose which processes to complete or wait for subsequent to initiating the request. Consequently, there is no defense against a process that is initiated and never completes (e.g., due to a hardware failure, time-out, etc.). Further, the various stages of completion of a client request are intertwined specifically to the implementation of the client request or the server response.

SUMMARY OF THE INVENTION

The invention provides for the coordination of client/server processes. One aspect of computer operating systems is to ensure that a request to perform an I/O operation or server operation completes and is only acted on exactly once (i.e., no request should be lost and none should be processed twice). The underlying operating system should also permit clients to terminate requests after they have been issued without regard to the precise state of the request (e.g., the request may not have been forwarded to the server, or may already have been completed when the client's request to terminate the request was received). Furthermore, in a multi-processing system, there may be multiple clients and servers executing on independent hardware processors (so called "symmetric multiprocessing") that can initiate, process, abort, or complete a request, and the operating system must ensure that exactly one of these competing processes actually operates on the request even if it had been initiated, processed, or aborted on a different processor.

One or more embodiments of the invention provide for a completion object in an object oriented environment comprised of various states of completion of a client request. The completion object may be manipulated to transition from one state to another by both the client and server. One or more embodiments provide for the following states of completion: idle, ready, active, completing, completed, and acknowledged. In the idle state, the completion object is obtained by the client (by constructing a new object or retrieving an existing object that has been recycled). In the ready state, the request has been initialized but not yet issued to the server or I/O device. In the active state, the server processes the I/O request. In the completing state, the server has completed the I/O operations requested but has not yet stored the results. In the completed state, the server stores the results to be returned to the client and notifies the client. In the acknowledged state, the client examines the results, performs additional operations and frees up the completion object for use by another client request.

Depending on the state of the completion object, a request to cancel the I/O operations may require varying actions. The completion object provides the ability to easily and quickly determine where in the completion process an I/O request is. Further, when a client request is canceled, the completion object provides the ability to easily identify the actions necessary to properly cancel the request.

DETAILED DESCRIPTION OF THE INVENTION

The invention is a method and apparatus for coordination of client/server processes. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
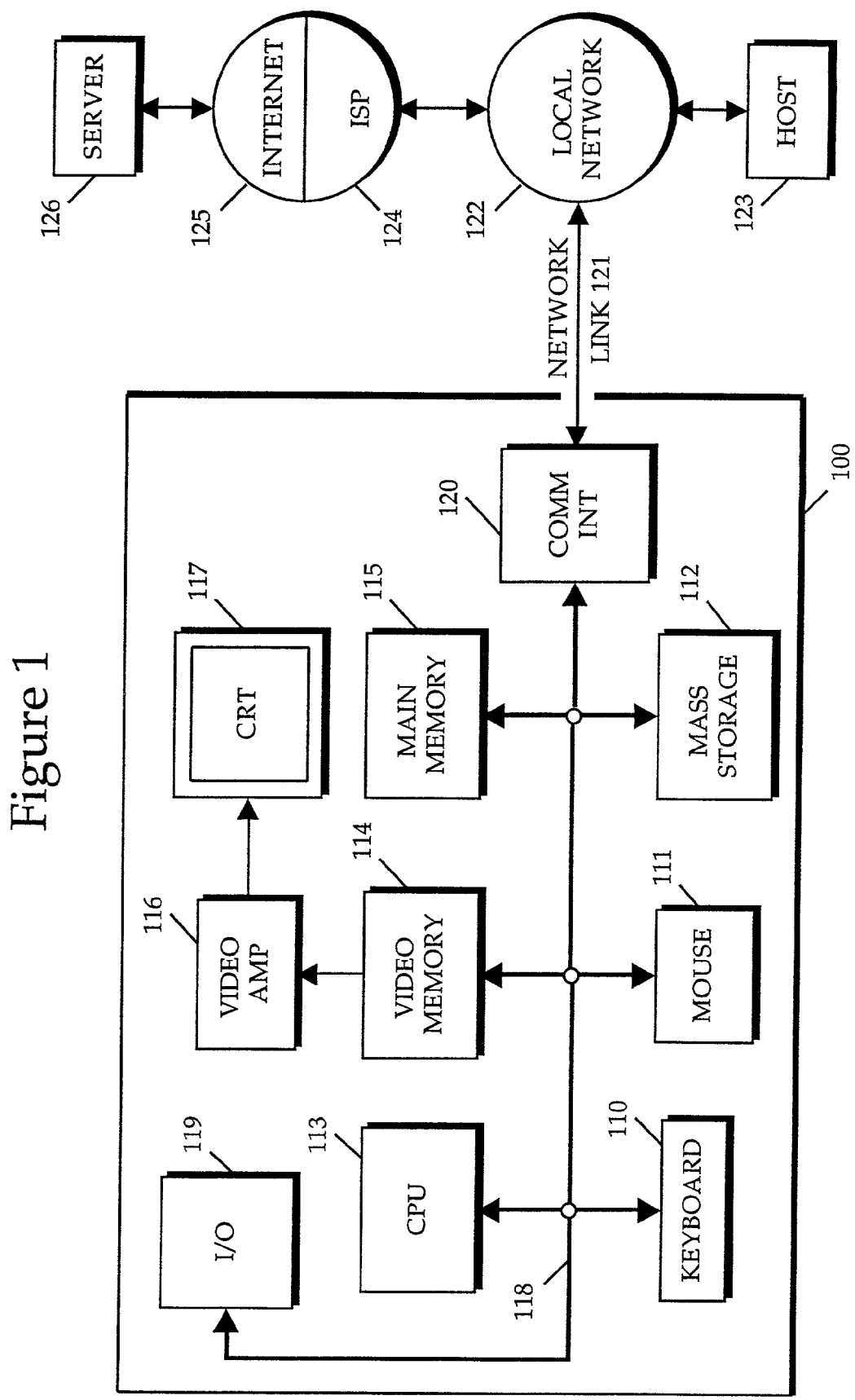
FIG. 1 is a block diagram of one embodiment of a computer system capable of providing a suitable execution environment for an embodiment of the invention.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bidirectional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

As indicated in the background, client processes and server processes may contain multiple related functions and data structures. To encapsulate these related functions and data structures, one embodiment of the invention utilizes a standard object oriented programming (OOP) language approach. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. Some programming languages also provide a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An abstract class defines an object that does not provide implementations for all methods needed to manage that method. Abstract classes are always subclassed by a concrete class definition that completes the class definition. A concrete class defines an object that provides implementations for all methods needed to manage that method. Concrete classes may be subclassed to provide additional capabilities, but this is not a requirement.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of the completion of I/O requests by a client and server.

Embodiment of Software Apparatus for Configuring a Computer

One embodiment of the invention provides for an object with multiple states that provides the ability for a client to initiate, cancel, and complete requests, and servers to process and abort requests without risk that a request will be lost or processed twice.

The following definitions will be used to describe and illustrate one or more embodiments of the invention:

Process: An independent execution environment. In some operating system documentation, a process is called a task or thread, however the distinction between process, task, and thread is not relevant to this invention.

Request The action that the client requests of the server. A request is always in a particular state. The request refers to all data that is needed to process the operation, including device selection, command, client memory, and any associated server resources.

Client The process that initiates a request.

Server The process that carries out the request.

State The current status of the request. The possible states will be described below.

Transition The process of changing the request state. Certain transitions are performed by the client and others by the server. A transition is an atomic operation with respect to all asynchronous processes on the computer system, including any attached processors in a symmetric multi-processor configuration.

One or more embodiments of the invention provide for various states of completion (referred to as completion states) for a client request or process. As a client request proceeds through the various states, actions by the server and client, such as a termination of the request, may be executed and may differ depending on the current state of the request. The various states of completion are encompassed in an object, referred to as a completion object that may be accessed and manipulated by both the client and the server.

Table 1 summarizes the various request states and the state that is next available through a transition. In Table 1, the client refers to the entity that initiated a request and the server refers to the entity that carries out the request.

request can, from the client's perspective, be completed. An object in the ready state 208 can transition to either active state 210 (if handled by the bus interface server) or to completing state 212 if the request is canceled by client 200 (a transition resulting from a canceled request is indicated by arrows 220).

TABLE 1

| Initial State | Next State | Called By | Method | Called At |
|---|---|---|---|---|
| none | Idle | Client | new | Before beginning any operation. Because request structures will generally be reused, the transition from none to Idle takes place only when the client constructs a new Completion object. |
| Idle | Ready | Client | prepare | After initializing a new I/O request, immediately before it is issued to the server. |
| Ready | Active | Server | activate | After receiving a new I/O request, just before it is processed |
| Ready | Completing | Server | Cancel | The server's stopRequest method first executes the cancel method. If it succeeds, the request had never been processed by the server (because of pipelining asynchrony) and the request should be immediately completed with ioErrorNotStarted status. If the cancel method fails, the server had begun processing the request and must take some server-specific action (such as SCSI ABORT) to complete the request. |
| Active | Complete | Server | completing | After the hardware bus interface finishes processing the request but before storing any data into the IOResult object. |
| Completing | Completed | Server | complete | After updating the IOResult object, The complete method restarts ( or otherwise notifies) the client's completion task. The completed method is the last action taken by the server on behalf of this I/O request. |
| Completed | Acknowledged | Client | acknowledge | After the client is notified that this I/O request is complete, but before examining any result status or values. |
| Acknowledged | Idle | Client | finish | After completing all client action on this request, but before "recycling" or disposing the IOCompletion object. |

Figure 2:
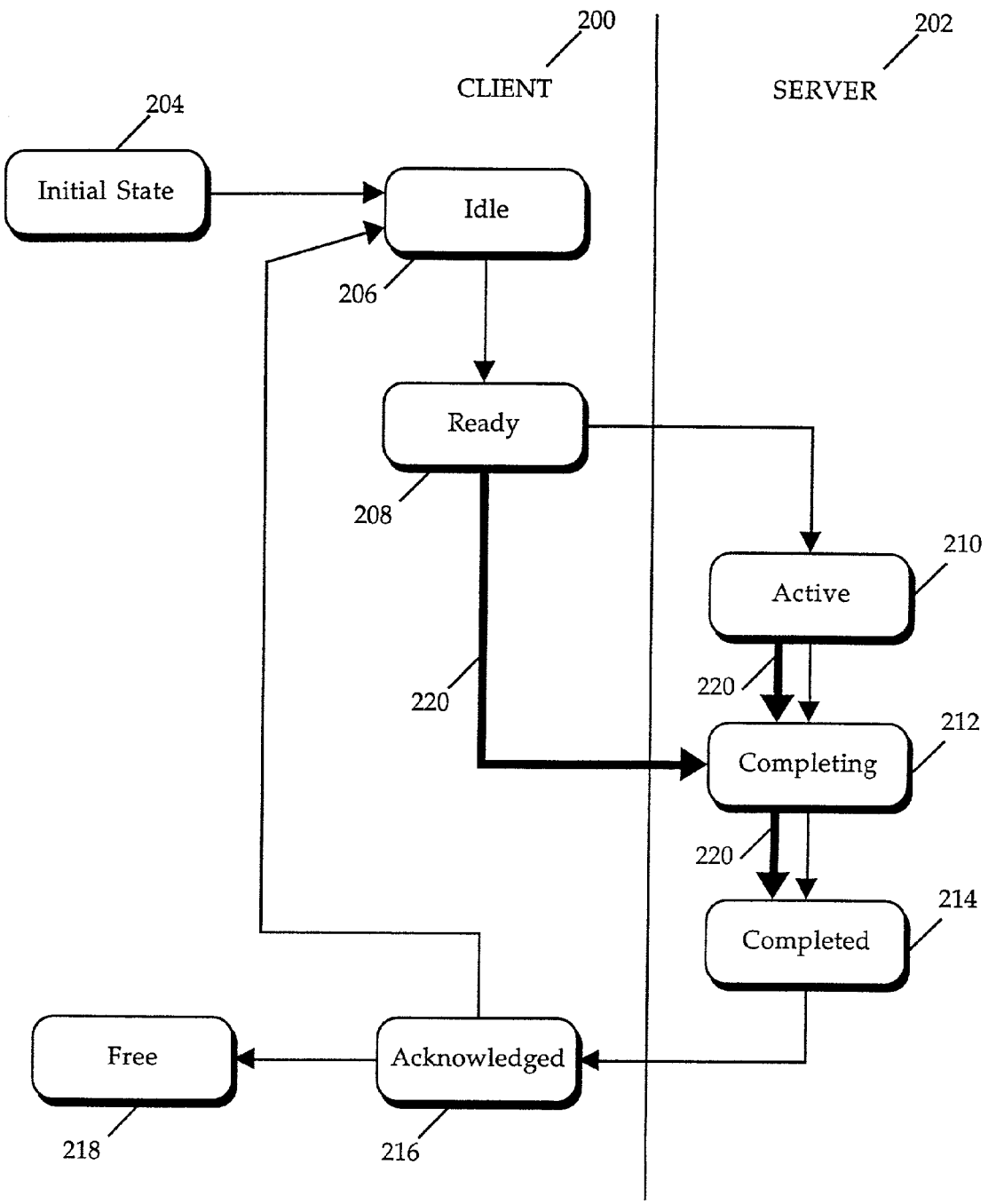
FIG. 2 demonstrates the various states of a completion object as the object progresses through the various transitions as a result of actions by a client and a server.

FIG. 2 demonstrates the various states of a completion object (as indicated in Table 1) as the object progresses through the various transitions as a result of actions by client 200 and server 202. Prior to creating a new object, the object does not exist as indicated by the initial state 204 of the completion object. Prior to issuing a request, client 200 creates a new completion object (or obtains an old completion object that is available). Once the object is created, the completion object enters the idle state 206. If client 200 merely obtains an object that is available, the object is already in idle state 206. At the idle state 206, the object is not in use. Additionally, while in idle state 206, client 200 binds the object to other information needed for the client request and initializes the request.

Once the request is initialized, the completion object is in use, but not activated, and client 200 transitions from idle state 206 to ready state 208. Ready state 208 implies that client 200 intends to use the object to manage an asynchronous I/O request, but the request has not been issued. Before changing the object's state from idle 206 to ready 208, the object has initialized enough context that the associated I/O Once the I/O request has been issued to the server, the completion object transitions from ready state 208 to active state 210. Once activated, client 200 may interact with the object through an abort or terminate request. Further, once made active, all requests will complete. Server 202 then begins processing the I/O request. The object remains in active state 210 while the request progresses under the control of server 202 and the appropriate hardware device.

Alternatively, if client 200 cancels the request prior to issuing the request to the server, the completion object transitions from ready state 208 to completing state 212 through path 220. However, if the client request to cancel fails, the request has already been issued to the server, and alternative server-specific action must be taken to complete the request to cancel.

When the associated hardware device completes processing the request(or the request terminates because of an error), server 202 updates the client's result buffers. The completion object then transitions from active state 210 to completing state 212. At the beginning of the completion state, the I/O actions have been completed by the server. However, the results of the server's actions have not yet been stored.

Alternatively, if the client cancels the client request while in the ready state 208 or active state 210, any actions performed may be reversed and the object transitions into completing state 212. While in completing state 212, the I/O completion information is updated, such as the request status and actual transfer count.

When all result data has been prepared and stored, server 202 releases the object and notifies client 200 of the release. Prior to notifying the client, the object transitions from completing state 212 to completed state 214. Client notification is initiated by executing a client wakeup procedure (task unblock, signal, broadcast, etc.). Server 202 may also execute client 200's completion action.

When server 202 has finished all processes related to the client request, the completion object transitions from completed state 214 to acknowledged state 216. The acknowledged state 216 indicates that the client 200 has been notified that the I/O request is complete, but client 200 has not yet examined any result status or values. The completion object's state is transitioned to acknowledged 216 prior to examining any values. By transitioning prior to examination, the invention ensures that polled I/O and I/O that uses thread broadcast completion will process an I/O request exactly once, even if multiple clients contend for the object.

After completing all client action on the request, the completion object may be freed 218. Freeing up the completion object may act as a recycling of the object by placing the object in idle state 206. In idle state 206, the object is available for recycling and reuse by another client request.

Thus, one or more embodiments provide for the objectifying of the various phases of completion of an I/O request or client request. By implementing the completion of request using a completion object, the client can specify the level or kind of completion (notification, wakeup, etc.) and the server or driver does not need to know about the kind of completion by the client. Thus, the server (the entity completing the request) does not need to know about the entity requesting the completion. The client merely provides a completion object reference to the server and then both the client and server use methods provided by the completion object to transition from one state to another. Thus, the entity completing the request need only know how to move from one stage to another. Additionally, the utilization of various states provides the flexibility of stopping or canceling a request at various different times.

Figure 3:
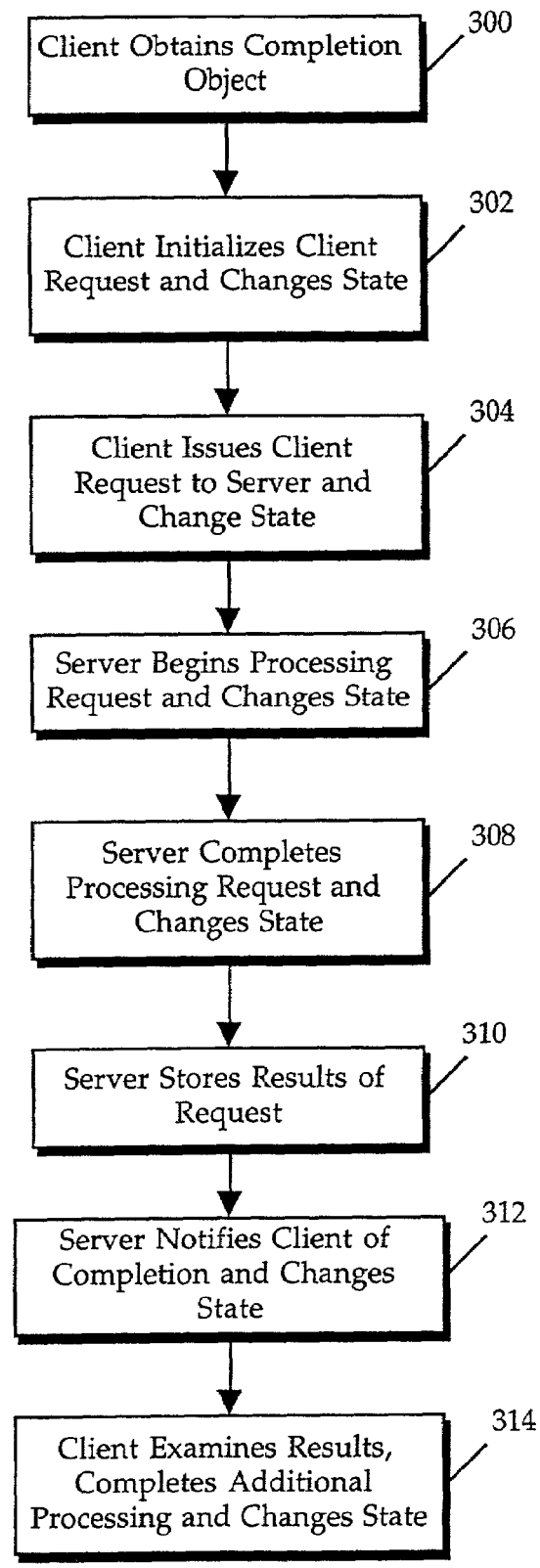
FIG. 3 illustrates the processing of a client request and when states are changed according to one or more embodiments of the invention.

FIG. 3 further illustrates the processing of a client request as described with respect to FIG. 2 and Table 1 above. FIG. 3 also illustrates when states are changed according to one or more embodiments of the invention. At step 300, client 200 obtains a completion object. The object may be created (using the new method for example), or it may be a recycled object. At step 302, client 200 initializes the client request and changes the state from idle 206 to ready 208. At step 304, client 200 issues the client request to server 202 and changes the state from ready 208 to active 210. Alternatively, if the client request has been canceled prior to issuing the request to server 202, the state would be changed to completing 212.

At step 306, server 202 begins processing the request and changes the state from active 210 to completing 212. Alternatively, if a request to cancel the operation was received during the active state, further server actions are stopped, and the state is also changed to completing 212.

At step 308, server 202 completes processing the request and changes the state from completing 212 to completed 214. During the completed state 214, the results of the server's operations are stored. At step 310, the server notifies the client of the completion of the requested operation and changes the state to acknowledged 216. Alternatively, one or more embodiments may not provide for the client 200 to be notified of the completion. In such an embodiment, client 200 may poll the completion objects at varying time intervals to determine the current state of the client's requests. At step 314, client 200 examines the results and completes any additional processing if necessary. Subsequently, client 200 frees the completion object for recycling and changes the state to idle 206 for use by another client request.

During any step of FIG. 3, client 200 or server 202 may elect to cancel the request. Depending on the state of the completion object, different actions may need to be taken to properly cancel the request.

If the request is canceled prior to issuing the request to server 202, no further action is necessary and the request may shift to the completing state 212. However, if the request has already been issued to the server 202 and the processing is active (or in active state 210), additional server-specific action is necessary.

If the I/O operation has already completed but the results have not yet been stored (i.e., the object is in completing state 212), a determination must be made regarding whether the server's actions are reversible or may be rolled back. If the processing cannot be rolled back, the information may be stored during the completed state 214.

Subsequent to storing the results at step 214, a request to cancel may not change the server's conduct. Thus, the client is notified of the results and the completion object enters the acknowledged state 216 where the results may be examined and the object may be recycled for use by another client request if all processing by both the client and server is complete.

Class Implementation

According to one or more embodiments of the invention, a class called IOCompletion is the parent class for all completion objects. The IOCompletion class may be an abstract class. In one or more embodiments, the IOCompletion object defines an IOCompletionState that consists of six states that may be represented as numbers: kIOCompletionIdle=0,kIOCompletionReady, kIOCompletionActive, kIOCompletionCompleting, kIOCompletionCompleted, kIOCompletionAcknowledged. When a new IOCompletion object is created or constructed, the new object's state is initially set to kIOCompletionIdle.

Various methods may be defined by the IOCompletion object to manage the object's states and to transition the object from one state to another. The methods defined by the IOCompletion object are implemented by subclasses of the IOCompletion object. The methods that transition the object from one state to another and when the methods are called are indicated in Table 1. For example, when a new object is created, the state transitions from none to idle by use of a new method. The various methods that may be defined and implemented are getstate (which returns the current state of the object), prepare, activate, completing, complete, acknowledge, finish, and cancel. In one or more embodiments and the following discussion, a client such as high-level device driver may use a bus interface "server" to carry out an asynchronous I/O request. In the SCSI (Small Computer System Interface) context, a "client" may be a disk partition handler or scanner driver, while a "server" may be a hardware interface module. As described above, the following methods are responsible for transitioning the current state of the object to a new state:

New

Allocate an IOCompletion object and initialize its state to kIOCompletionIdle. Subclasses will typically override this to allocate notification objects that implement their behavior.

The following pseudocode illustrates one or more embodiments of the new method:

```
request = clientAllocateNewRequest;
setRequestState(request, State_Idle);
/* The request may be used immediately or    */
/* stored on a recycle list together with    */
/* previously used requests                  */
exitClientConstructNewRequest;
```

Prepare

If this object is not in the kIOCompletionIdle state, return ioErrorWrongCompletionTransition status and do nothing. Else, set the state to kIOCompletionReady and return successfully.

This method is called by the client after it completely constructs the request and immediately before issuing it to the server. The client may not examine or modify any data pertaining to this request after successfully executing the prepare method until the request completes.

An error status indicates a programming error: the object is corrupted or in use by more than one I/O request.

The following pseudocode illustrates one or more embodiments of the prepare method:

```
/* The client constructs a new request or retrieves  */
/* an idle request from its "recycle" list. The      */
/* request is initially in the Idle state.           */
clientConstructNewServerRequest (request);
status = setReadyStateFromIdle (request, State_Ready);
if (status == error) {
    /* This is unexpected: the request is in use by  */
    /* another process. This may be a programming error. */
}
else {
    clientIssueNewRequestToServer (request);
    /* The client may wait for completion or         */
    /* process other requests.                       */
}
exitClientProcessRequest;
```

Activate

If this object is not in the kIOCompletionReady state, return ioErrorWrongCompletionTransition status and do nothing. Else, set the state to kIOCompletionActive and return successfully.

This method is called by the server immediately after it receives a new request and before it before it begins processing it. The server may not examine or modify any data pertaining to this request before successfully executing the activate method. The server may not examine or modify any data in the request's IOResult object while in the active state.

An error status may indicate an synchronous race condition (the client canceled this request by executing the stopRequest method): delete all references to this object and its associated I/O request. See the discussion of the cancel method concerning race condition avoidance.

The following pseudocode illustrates one or more embodiments of the activate method:

```
status = setActiveStateFromReady (request);
if (status == error) {
    /* This request was aborted before it was received */
    /* Ignore this request and continue normal operation*/
}
else {
    serverInitiateRequestAction (request);
}
exitServerNewRequest;
```

Completing

If this object is not in the kIOCompletionActive state, return ioErrorWrongCompletionTransition status and do nothing. Else, set the state to kIOCompletionCompleting and return successfully.

This method is called by the server after it completes all actions required by this request and before updating the request's IOResult object.

An error status may indicate an asynchronous race condition (the request is simultaneously being completed by two I/O threads) but is more likely to be a programming error or memory corruption: delete all references to this object and its associated I/O request.

The following pseudocode illustrates one or more embodiments of the completing method showing the transition to the completed state:

```
status = setCompletingStateFromActive (request);
if (status == error) {
    /* This request was aborted during operation or has */
    /* been completed by another processor. Ignore this */
    /* request and continue processing.                 */
}
else {
    serverReturnResultToClient:
    serverCopyResultsToClientMemory (request);
    status = setCompletedStateFromCompleting (request);
    if (status == error) {
        /* Unexpected error: log an error and continue */
    }
    else {
        serverNotifyClientOfCompletion (request);
    }
}
exitServerReturnRequestToClient;
```

Completed

If this object is not in the kIOCompletionCompleting state, return ioErrorWrongCompletionTransition status and do nothing. Else, set the state to kIOCompletionCompleted and return successfully.

This method is called by the server after it updates the request's IOResult object and immediately before notifying the client that the I/O request has completed. The server may not examine or modify any data pertaining to this I/O request after executing the completed method.

An error status may indicate an asynchronous race condition (the request is simultaneously being completed by two I/O threads) but is more likely to be a programming error or memory corruption: delete all references to this object and its associated I/O request.

The following pseudocode illustrates one or more embodiments of the completed method showing the transition from the completing state:

```
        status = setCompletingStateFromActive (request);
        if (status == error) {
            /* This request was aborted during operation or has  */
            /* been completed by another processor. Ignore this  */
            /* request and continue processing.                  */
        }
        else {
            serverReturnResultToClient:
            serverCopyResultsToClientMemory (request);
            status = setCompletedStateFromCompleting (request);
            if (status == error) {
                /* Unexpected error: log an error and continue */
            }
            else {
                serverNotifyClientOfCompletion (request);
            }
        }
        exitServerReturnRequestToClient;
```

Acknowledge

If this object is not in the kIOCompletionCompleted state, return ioErrorWrongCompletionTransition status and do nothing. Else, set the state to kIOCompletionAcknowledged and return successfully.

This method is called by the client immediately after it is notified that the I/O request has completed and before examining any results pertaining to this request.

An error status may indicate an asynchronous race condition (the request is simultaneously being completed by two I/O threads) but is more likely to be a programming error or memory corruption: delete all references to this object and its associated I/O request.

After a successful return, all server processing is complete and this specific client execution thread has full control of the I/O request status and data.

The following pseudocode illustrates one or more embodiments of the acknowledge method showing the transition to the idle state:

```
        status = setAcknowlegedStateFromCompleted (request);
        if (status == error) {
            /* Some other asynchronous process is acting */
            /* on this request. This may be used in a    */
            /* request "polling" loop. It is not         */
            /* necessarily an error.                     */
        }
        else {
            client = setIdleStateFromAcknowleged (request);
            if (status == error) {
                /* This is unexpected: the request is in */
                /* use by another process. This may be   */
                /* an error.                             */
            }
            clientRecycleRequest (request);
        }
        exitClientCompletion;
```

Finish

If this object is not in the kIOCompletionAcknowledged state, return ioErrorWrongCompletionTransition status and do nothing. Else, set the state to kIOCompletionIdle and return successfully.

After a successful return, the client may dispose of the I/O completion object or recycle it for another I/O request.

An error status indicates a programming error: the object is corrupted or in use by more than one I/O request.

The following pseudocode illustrates one or more embodiments of the finish method showing the transition from the acknowledged state:

```
        status = setAcknowlegedStateFromCompleted (request);
        if (status == error) {
            /* Some other asynchronous process is acting */
            /* on this request. This may be used in a    */
            /* request "polling" loop. It is not         */
            /* necessarily an error.                     */
        }
        else {
            client = setIdleStateFromAcknowleged (request);
            if (status == error) {
                /* This is unexpected: the request is in */
                /* use by another process. This may be   */
                /* an error.                             */
            }
            clientRecycleRequest (request);
        }
        exitClientCompletion;
```

Cancel

If this object is not in the kIOCompletionReady state, return ioErrorWrongCompletionTransition status and do nothing. Else, set the state to kIOCompletionCompleting and return successfully.

This method is called by the server's stopRequest method when the client wishes to terminate an I/O operation. It will fail if the operation has already been acted on by the server.

If the cancel method returns successfully, the I/O request had not been acted on by the server. The server should set the ioStatus field in the IOResult object to ioErrorNotStarted (and other fields to appropriate values) and execute the completed method to notify the client's I/O completion task. The I/O request will subsequently be handled through the client's common completion procedure.

The following pseudocode illustrates one or more embodiments of the cancel method:

```
        status = setCompletingStateFromReadyState (request);
        if (status == error) {
            /* This is an active request. Signal the hardware  */
            /* device and, eventually, complete the request by */
            /* the serverCompleteRequest action.               */
        }
        else {
            /* This request was not started. Complete directly */
                goto serverReturnRequestToClient;
        }
        exitServerAbortRequest;
```

The state transitions are managed by the IOCompletion parent class, and clients and bus interface servers can use its public methods to perform transitions. An incomplete or incorrect transition indicates a conflict with some other asynchronous process or a call to transition the process at the wrong time. For example, the prepare method transitions the object from idle state to ready state. If prepare is called and the object is not in idle state, an error status value is returned. An object may be in a state other than idle as a result of programming error, the object may be corrupted, or in use by more than one request. Other transitions indicate either programming error or race conditions. The latter are possible when several clients may need to operate on a single completion object. On encountering an incorrect transition, the caller should delete all of its references to the object, but should not free the object. Thus, if the activate method, completing method, completed method, acknowledge method, finish method, or cancel method is called when the object is not in ready state, active state, completing state, completed state, acknowledged state, or ready state respectively, an error status value is returned, and all references to the object should be deleted.

The cancel method is called when the client wishes to terminate an I/O operation. The cancel method transitions the object from ready state to completing state bypassing the active state. If the cancel method is called and the server has already completed or has begun operations pursuant to the client request, the operation will fail.

In one or more embodiments of the invention, the IOCompletion abstract class has various abstract and concrete subclasses. For example, variants of the subclasses may implement an IOHardwareCompletion abstract class (an abstract class that is the parent of completion classes that can be completed from a hardware interrupt context) or an IOThreadCompletion abstract class (an abstract class that is the parent of completion classes that can be completed from an I/O thread context), both of which are abstract classes of the IOCompletion abstract class.

The following are some examples of variant concrete completion classes that implement the abstract classes described above:

1. IONoCompletion "Fire" and "forget": the client receives no direct notice of I/O completion. Once a client request issues, the client will receive no notification when the request is complete. A "Fire and Forget" implementation is useful when the client intends to poll through the various completion objects for I/O completion (e.g., checking each object to determine if its state is acknowledged).
2. IOSynchronousCompletion Client execution is suspended and resumed when I/O completes. An implementation of this class provides standard NeXTStep "Driver Kit" I/O completion services to its clients. For example, the IOSynchronousCompletion class may be implemented in the Objective C programming language used to implement NeXTStep DriverKit as follows:

```
#import <machkit/NXLock.h>
enum {
    kCommandPending = 0,
    kcommandComplete = 1
}
@interface IOSynchronousCompletion :
    IOThreadContextCompletion
{
    NxConditionLock    *commandLock;
}
@end
@implementation IOSynchronousCompletion
/*
 * Constructor and destructor methods.
 */
+ (IOCompletion) new
{
    IOSynchronousCompletion *instance [self
        alloc];
    if (instance!=Null) {
        instance ->commandLock
            = [[NxConditionLock alloc]initWith :
                kCommandPending];
        if (instance->commandLock == Null) {
            [instance free];
            instance = NULL;
        }
    }
```

-continued

```
    return (instance);
}
- free
{
    if (commandLock ! = Null) {
        [commandLock free];
    }
    return ([super free]);
}
- (IOReturn)   prepare     /* Idle->Ready   */
{
    IOReturn  ioReturn = ([super prepare]);
    if (ioReturn == ioStatusSuccess) {
        [commandLock initWith : kCommandPending];
    }
    return (ioReturn);
}
- (IOReturn)   activate    /*Ready->Active  */
{
    return ([super activate]);
}
- (IoReturn)   cancel      /*Ready->Completing */
{
    return ([super cancel]);
}
- (IOReturn)   completing  /* Active->Completing  */
{
    return ([super completing]);
}
- (IOReturn)   complete  /* Completing->Completed   */
{
    IOReturn  ioReturn;
    [commandLock lock];
    if ((ioReturn= [super complete]) ==
        ioStatusSuccess) {
            [commandLock unlockWith:kCommandComplete];
    }
    else /* race condition */ {
            [commandLock unlock];
            ioReturn=ioErrorWrongCompletionTransition;
    }
    return (ioReturn);
}
- (IOReturn) acknowledge / *Completed->Acknowledged   */
{
    return ([super acknowledge]);
}
- (IOReturn)   finish    /* Acknowledged->Idle   */
{
    return ([super finish]);
}
- (IOReturn) clientWait /*Wait for I/O completion*/
{
    IOCompletionState state = [self getState];
    IOResult ioResult = ioStatusSuccess;
    switch (state) {
    case kIOCompletionActive:
            /* I/O in progress*/
    case kIOCompletioncompleting:
            /* I/O already completed*/
    case kIOCompletionCompleted:
            /* I/O completed and notified */
            [commandLock lockWhen : kCommandComplete];
            [commandLock unlock];
            break;
    default:
            ioResult = ioErrorWrongCompletionTransition;
            /* Can't happen*/
            break;
    }
    return (ioResult);
}
@end
```

In addition to the "no completion" and "synchronous completion" concrete classes described above, high-level drives can also provide classes that implement other completion procedures, including, but not limited to the following:

(a) Signal Completion: when the server executes the "complete" method, the concrete IOSignalCompletion class executes a "signal" operation on a semaphore. The driver can use operating system services to conditionally or unconditionally wait on a semaphore or group of semaphores.

(b) Message Completion: when the server executes the "complete" method, the IOMessageCompletion class sends a message to a port provided by the client. This allows a programmer to separate the client's I/O start and I/O completion operation into independent execution threads.

(c) Callback Completion: when the server executes the "complete" method, the IOCallbackCompletion calls a subroutine provided by the client. This callback can be done within the hardware interrupt context or within the client's own context.

(d) Java Notification: when the server executes the "complete" method, the IOCallbackCompletion calls an operating-system specific function that causes the Java virtual machine to make a client-provided Java thread runnable. This allows high-level device drivers to directly interact with hardware interface modules while keeping proper separation between the low-level operating-system specific actions of the interface component and the high-level Java component.

Thus, a method and apparatus for coordination of client/server processes is described in conjunction with one or more specific embodiments. The invention is defined by the claims and their full scope of equivalents.

The invention claimed is:

1. A system comprising:
   one or more processors;
   a memory coupled to said one or more processors;
   one or more sequences of instructions which, when executed by said one or more processors, cause said one or more processors to perform the steps of:
   obtaining a completion object associated with a first request from at least one client to at least one server, wherein said completion object indicates a state of completion of said first request;
   transitioning said completion object from indicating a first state of completion of said first request to indicating a second state of completion of said first request in response to a message from said at least one client; and
   transitioning said completion object from indicating a third state of completion of said first request to indicating a fourth state of completion of said first request in response to a message from said at least one server;
   wherein said second state of completion and said third state of completion are the same state of completion.

2. The system of claim 1, said instructions including instructions for causing said one or more processors to perform the step of:
   notifying a computer process when said first request is complete.

3. The system of claim 1, wherein said instructions for obtaining said completion object comprises instructions for obtaining a reference to an existing completion object.

4. The system of claim 1, said instructions including instructions for causing said one or more processors to perform the steps of:
   determining if said first request conflicts with a second request; and
   deleting one or more references to said completion object if a conflict exists.

5. A computer-readable medium bearing one or more sequences of instructions for coordinating computer processes, said instructions which, when executed by one or more processors, cause said one or more processors to perform the steps of:
   obtaining an object associated with a first request from at least one client to at least one server, wherein said object indicates a state of completion of said first request;
   transitioning said completion object from indicating a first state of completion of said first request to indicating a second state of completion of said first request in response to a message from said at least one client; and
   transitioning said completion object from indicating a third state of completion of said first request to indicating a fourth state of completion of said first request in response to a message from said at least one server;
   wherein said second state of completion and said third state of completion are the same state of completion.

6. The system of claim 1, wherein said instructions including instructions for causing said one or more processors to perform the step of:
   querying said completion object to determine said status of said particular operation as indicated by said completion object's state.

7. The computer-readable medium of claim 6, said instructions including instructions for causing said one or more processors to perform the step of:
   notifying a computer process when said first request is complete.

8. The computer-readable medium of claim 6 wherein said instructions for obtaining said object comprises instructions for obtaining a reference to an existing object.

9. The computer-readable medium of claim 6, said instructions including instructions for causing said one or more processors to perform the steps of:
   determining if said first request conflicts with a second request; and
   deleting one or more references to said object if a conflict exists.

10. The computer-readable medium of claim 6, wherein said first request is a client request for a specific function, action, or resource of a server.

11. The computer-readable medium of claim 6, wherein said first state of completion is an idle state and said second state of completion is a ready state.

12. The computer-readable medium of claim 11, wherein said third state of completion is a ready state and said fourth state of completion is an active state.

13. The computer-readable medium of claim 11, wherein said third state of completion is a ready state and said fourth state of completion is a completing state.

14. The computer-readable medium of claim 6, wherein said third state of completion is an active state and said fourth state of completion is a completing state.

15. The computer-readable medium of claim 14, wherein said third state of completion is a completing state and said fourth state of completion is a completed state.

16. A system comprising:
   one or more processors;
   a memory coupled to said one or more processors; and
   one or more sequences of instructions which, when executed by said one or more processors, cause said one or more processors to perform the steps of:

specifying a level of completion of a particular operation in a completion object associated with said particular operation; and transitioning said completion object between a plurality of states of completion, said completion object's state of completion indicating a status of said particular operation;

wherein said transitioning includes transitioning said completion object from a first state of completion to a second state of completion in response to a message from a first entity of a plurality of entities involved in said operation, transitioning said completion object from a third state of completion to a fourth state of completion in response to a message from a second entity of the plurality of entities involved in said operation, and wherein said second state of completion and said third state of completion are the same state of completion.

17. The system of claim 16, said instructions including instructions for causing said one or more processors to perform the step of:

said second entity completing said particular operation without information about said at first entity.

18. The system of claim 16, said instructions including instructions for causing said one or more processors to perform the step of:

notifying a computer process when said particular operation is complete.

19. The system of claim 16, wherein said particular operation may be terminated in a first state and a second state.

20. The system of claim 16, wherein said instructions for specifying said level of completion in said completion object comprises instructions for obtaining a reference to said completion object.

21. The system of claim 16, said instructions including instructions for causing said one or more processors to perform the steps of:

determining if said particular operation conflicts with a second operation; and deleting one or more references to said completion object if a conflict exists.

22. The system of claim 16, wherein said particular operation is an I/O request from a client to a server.

23. A method of providing completion status for a client request, comprising:

a client obtaining a completion object, said completion object indicating a first completion state of a plurality of completion states;

said client associating said first completion state with a current status of a client request;

said client transitioning said first completion state to a second completion state when said client request is ready to be sent to a server;

said client providing said client request and said completion object to said server; and said server transitioning said completion state from a third completion state to one of a subset of said plurality of completion states when processing of said client request by said server enters one or more phases corresponding to said subset of said plurality of completion states, wherein said second completion state and said third completion state are the same completion state.

24. The method of claim 23, wherein obtaining said completion object comprises obtaining a reference to an available completion object in an idle state.

25. The method of claim 23, wherein obtaining said completion object comprises obtaining a new instance of a completion object class.

26. The method of claim 23, wherein associating said completion state with said current status of said client request comprises:

associating said client request with said completion object; and initializing said completion state.

27. The method of claim 23, further comprising said server returning said completion object and any results of said client request to said client.

28. The method of claim 23, further comprising said client polling said completion object to determine said current status.

29. The method of claim 23, further comprising notifying said client when processing of said client request is completed.

30. The method of claim 23, further comprising said client freeing said completion object.

31. The method of claim 30, wherein freeing said completion object comprises transitioning said completion object into an idle state for re-use.

32. The method of claim 23, further comprising at least one of said client and said server querying said completion object to determine said current status of said client request.

33. The method of claim 23, further comprising said completion object initiating one or more steps to cancel said client request at response to invocation of a cancellation method of said completion object, said one or more steps being dependent on said completion state.

34. The method of claim 23, further comprising said completion object returning an error when one of said client and said server attempts an invalid transition between said plurality of completion states.

35. The method of claim 23, further comprising:

receiving a second request;

determining that said second request conflicts with said client request; and deleting said second request.

36. A method for coordinating computer processes, the method comprising:

obtaining an object associated with a first request from at least one client to at least one server, wherein said object indicates a state of completion of said first request;

transitioning said completion object from indicating a first state of completion of said first request to indicating a second state of completion of said first request in response to a message from said at least one client; and transitioning said completion object from indicating a third state of completion of said first request to indicating a fourth state of completion of said first request in response to a message from said at least one server;

wherein said second state of completion and said third state of completion are the same state of completion.

37. A computer-readable storage medium storing one or more sequences of instructions which, when executed by one or more processors, cause said one or more processors to perform the steps of:

specifying a level of completion of a particular operation in a completion object associated with said particular operation; and transitioning said completion object between a plurality of states of completion, said completion object's state of completion indicating a status of said particular operation;

wherein said transitioning includes
transitioning said completion object from a first state of completion to a second state of completion in response to a message from a first entity of a plurality of entities involved in said operation,
transitioning said completion object from the third state of completion to a fourth state of completion in response to a message from a second entity of the plurality of entities involved in said operation, and
wherein said second state of completion and said third state of completion are the same state of completion.

38. A computer-readable storage medium storing one or more sequences of instructions for providing completion status for a client request, said instructions which, when executed by one or more processors, cause said one or more processors to perform the steps of:
in response to a client message, initializing a completion object to indicate a first completion state of a plurality of completion states;
in response to a client message, associating said first completion state with a current status of a client request;
in response to a client message, transitioning said frost completion state to a second completion state when said client request is ready to be sent to a server; and
in response to a server message, transitioning said completion from a third completion state to one of a subset of said plurality of completion states when processing of said client request by said server enters one or more phases corresponding to said subset of said plurality of completion states, wherein said second completion state and said third completion state are the same completion state.

39. The computer-readable medium of claim 6, wherein said first request is an I/O request from said at least one client to said at least one server.

* * * * *

UNITED STATES PATENT AND TRADEMARK OFFICE
CERTIFICATE OF CORRECTION

PATENT NO. : 7,233,972 B2
APPLICATION NO. : 10/157764
DATED : June 19, 2007
INVENTOR(S) : Martin A. Minow It is certified that error appears in the above-identified patent and that said Letters Patent is hereby corrected as shown below:

COLUMN 18
Claim 7: Line 28, delete "claim 6" and insert --claim 5--.
Claim 8: Line 33, delete "claim 6" and Insert --claim 5--.
Claim 9: Line 36, delete "claim 6" and insert --claim 5--.
Claim 10: Line 43, delete "claim 6" and insert --claim 5--.
Claim 11: Line 46, delete "claim 6" and Insert --claim 5--.
Claim 14: Line 55, delete "claim 6" and insert --claim 5--.

COLUMN 20
Claim 33: Line 29, delete "at response" and insert --in response--.
Claim 37: Line 57, delete "storage medium storing" and insert --medium bearing--.

COLUMN 21
Claim 38: Line 12, delete "storage medium storing" and insert --medium bearing--.

COLUMN 22
Claim 38: Line 4, delete "frost" and insert --first--.
Claim 39: Line 15, delete "claim 6" and insert --claim 5--.

Signed and Sealed this

Seventh Day of August, 2007

JON W. DUDAS
*Director of the United States Patent and Trademark Office*